United States Patent
Iguma et al.

(10) Patent No.: US 11,808,320 B2
(45) Date of Patent: Nov. 7, 2023

(54) ROLLING VIBRATION REDUCTION DEVICE FOR INTERNAL COMBUSTION ENGINE

(71) Applicant: TOYOTA JIDOSHA KABUSHIKI KAISHA, Toyota (JP)

(72) Inventors: Hiroki Iguma, Shizuoka-ken (JP); Ryota Tsuda, Susono (JP); Tomohito Ono, Susono (JP); Keiju Tomoda, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/699,753

(22) Filed: Mar. 21, 2022

(65) Prior Publication Data
US 2022/0307571 A1    Sep. 29, 2022

(30) Foreign Application Priority Data

Mar. 24, 2021    (JP) .................................. 2021-050597

(51) Int. Cl.
*F16F 15/26*    (2006.01)
(52) U.S. Cl.
CPC ..... *F16F 15/262* (2013.01); *F16F 2230/0011* (2013.01); *F16F 2232/02* (2013.01)
(58) Field of Classification Search
CPC .................................................... F16F 15/262
See application file for complete search history.

(56) References Cited

U.S. PATENT DOCUMENTS

| | | | |
|---|---|---|---|
| 5,528,348 A | 6/1996 | Miwa et al. | |
| 6,192,851 B1 * | 2/2001 | Asahara | F16F 15/20 |
| | | | 123/192.2 |
| 9,217,366 B2 * | 12/2015 | Tsunoda | F16F 15/002 |

FOREIGN PATENT DOCUMENTS

| | | | |
|---|---|---|---|
| JP | 06-042591 A | | 2/1994 |
| JP | 11311298 A | * | 11/1999 |
| JP | H11-311298 A | | 11/1999 |
| JP | 2000-120792 A | | 4/2000 |

OTHER PUBLICATIONS

Machine translation of JP 11311298 A, obtained from FIT database (Year: 1999).*

\* cited by examiner

*Primary Examiner* — Thomas C Diaz
(74) *Attorney, Agent, or Firm* — Dinsmore & Shohl LLP (57) ABSTRACT

A rolling vibration reduction device for an internal combustion engine includes: a main inertial system configured to rotate with a crankshaft of the internal combustion engine; a driving force transmission mechanism configured to transmit a rotational driving force of the crankshaft, a direction of the rotational driving force being reversed by the driving force transmission mechanism; and a sub-inertial system configured to rotate by the rotational driving force transmitted from the driving force transmission mechanism and to reduce rolling vibration of the internal combustion engine associated with rotation of the crankshaft by rotating in an opposite direction to the crankshaft. A torsional resonance frequency in the rolling vibration reduction device is set to a value higher than an explosion primary frequency at a maximum engine speed in a preset operating region of the internal combustion engine.

4 Claims, 8 Drawing Sheets

ROLLING VIBRATION REDUCTION DEVICE FOR INTERNAL COMBUSTION ENGINE

CROSS-REFERENCE TO RELATED APPLICATION

This application claims priority to Japanese Patent Application No. 2021-050597 filed on Mar. 24, 2021, incorporated herein by reference in its entirety.

BACKGROUND

1. Technical Field

The present disclosure relates to rolling vibration reduction devices for internal combustion engines.

2. Description of Related Art

Rolling vibration of the body of an internal combustion engine occurs due to rotation of a crankshaft of the internal combustion engine. Japanese Unexamined Patent Application Publication No. 6-042591 (JP 6-042591 A) discloses a technique for a rolling vibration reduction device that cancels such rolling vibration by reverse rotation of a sub-inertial system. In this technique, when resonance occurs and rolling vibration cannot be cancelled, the rolling vibration reduction device is disconnected to avoid useless rotation of the sub-inertial system.

SUMMARY

In the technique disclosed in JP 6-042591 A, however, rolling vibration cannot be effectively reduced since the rolling vibration reduction device is disconnected while resonance is occurring.

The present disclosure provides a rolling vibration reduction device for an internal combustion engine capable of reducing rolling vibration of the internal combustion engine.

A rolling vibration reduction device for an internal combustion engine according to one aspect of the present disclosure includes: a main inertial system configured to rotate with a crankshaft of the internal combustion engine; a driving force transmission mechanism configured to transmit a rotational driving force of the crankshaft, a direction of the rotational driving force being reversed by the driving force transmission mechanism; and a sub-inertial system configured to rotate by the rotational driving force transmitted from the driving force transmission mechanism and to reduce rolling vibration of the internal combustion engine associated with rotation of the crankshaft by rotating in an opposite direction to the crankshaft. A torsional resonance frequency in the rolling vibration reduction device is set to a value higher than an explosion primary frequency at a maximum engine speed in a preset operating region of the internal combustion engine.

According to the rolling vibration reduction device of the aspect of the present disclosure, the internal combustion engine will not be operated at frequencies higher than the torsional resonance frequency. Rolling vibration of the internal combustion engine can therefore be reliably reduced.

In the rolling vibration reduction device of the aspect of the present disclosure, at least one of a moment of inertia of the main inertial system and a moment of inertia of the sub-inertial system may be set in such a way that the torsional resonance frequency is set to a value higher than the explosion primary frequency.

According to the rolling vibration reduction device of the aspect of the present disclosure, the torsional resonance frequency can be increased by changing at least one of the moment of inertia of the main inertial system and the moment of inertia of the sub-inertial system.

In the rolling vibration reduction device of the aspect of the present disclosure, torsional rigidity of a torsional rigidity element in the rolling vibration reduction device may be set in such a way that the torsional resonance frequency is set to a value higher than the explosion primary frequency.

According to the rolling vibration reduction device of the aspect of the present disclosure, the torsional resonance frequency can be increased by changing the torsional rigidity of the torsional rigidity element.

The rolling vibration reduction device for the internal combustion engine according to the present disclosure can reliably reduce rolling vibration of the internal combustion engine because the internal combustion engine will not be operated at frequencies higher than the torsional resonance frequency.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of a rolling vibration reduction device for an internal combustion engine according to the present disclosure (hereinafter also simply referred to as the "rolling vibration reduction device") will be described. Embodiments to which the present disclosure is applicable are not limited by the present embodiment. A rolling vibration reduction device for an internal combustion engine according to the present disclosure is mounted on, for example, an electrified vehicle such as a series hybrid electric vehicle and includes: a main inertial system that rotates with a crankshaft of the internal combustion engine; a driving force transmission mechanism that reverses the direction of a rotational driving force of the crankshaft and transmits the resultant rotational driving force; and a sub-inertial system that rotates by the rotational driving force transmitted from the driving force transmission mechanism. The rolling vibration reduction device is configured to reduce rolling vibration of the internal combustion engine associated with rotation of the crankshaft as the sub-inertial system rotates in the opposite direction to the crankshaft.

Figure 1:
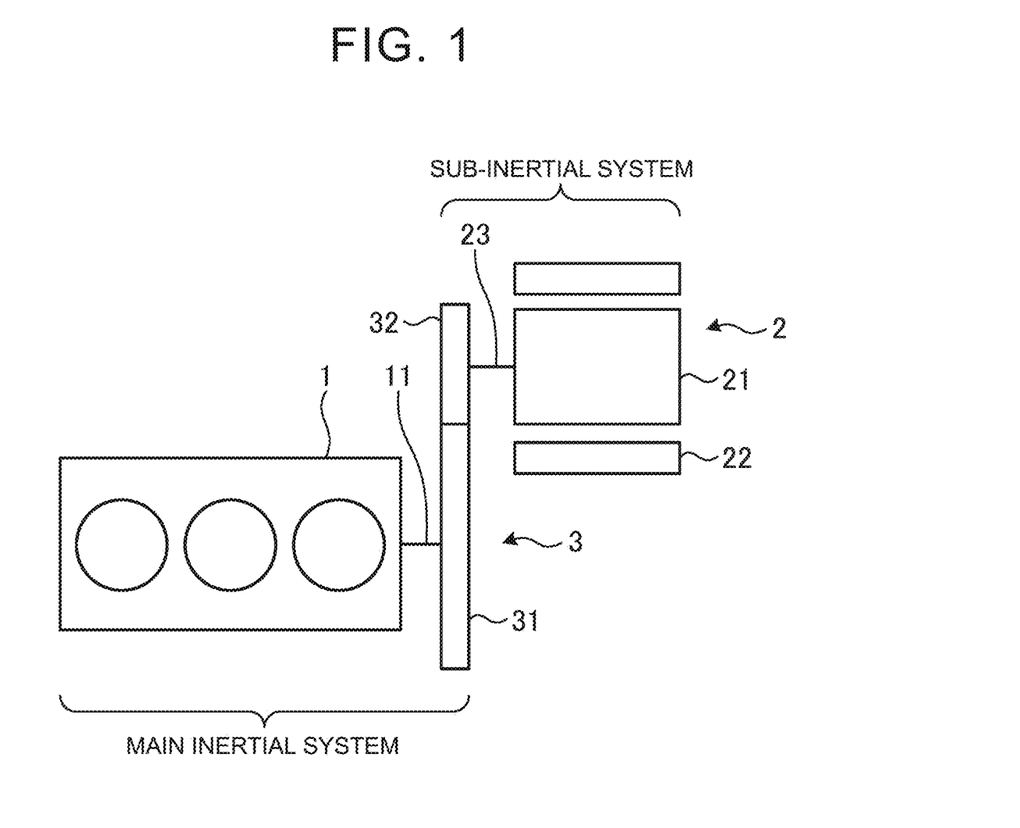
FIG. 1 shows an example of a rolling vibration reduction device according to an embodiment.

FIG. 1 shows an example of the rolling vibration reduction device according to the embodiment. The rolling vibration reduction device according to the embodiment includes: an engine 1 that is an internal combustion engine included in a main inertial system; a motor generator 2 included in a sub-inertial system; and a driving force transmission mechanism 3 that transmits a rotational driving force from the engine 1 to the motor generator 2. In the present embodiment, the engine 1 is a three-cylinder four-stroke engine.

The motor generator 2 is a rotating electrical machine including a rotor 21, a stator 22, and a rotor shaft 23. For example, the motor generator 2 has a function as a three-phase alternating current (AC) motor and generator. The rotor 21 is rotatably and coaxially mounted inside the stator 22. The rotor 21 is provided with a rotor shaft 23. The rotor shaft 23 is coaxial with the rotor 21, and the rotor 21 and the rotor shaft 23 rotate together.

The driving force transmission mechanism 3 includes a gear train composed of a drive gear 31 and a driven gear 32 that mesh with each other. The driving force transmission mechanism 3 receives a rotational driving force by the drive gear 31, reverses the direction of the received rotational driving force, and outputs the resultant rotation from the driven gear 32. The drive gear 31 is coaxially mounted on a crankshaft 11 of the engine 1, and the crankshaft 11 and the drive gear 31 rotate together. The driven gear 32 is coaxially mounted on the rotor shaft 23 of the motor generator 2, and the rotor shaft 23 and the driven gear 32 rotate together. For example, the drive gear 31 and the driven gear 32 may be parallel gears or helical gears.

In the rolling vibration reduction device according to the embodiment, a rotational driving force of the crankshaft 11 of the engine 1 is reversed in direction and transmitted to the rotor shaft 23 via the drive gear 31 and the driven gear 32 of the driving force transmission mechanism 3, and the rotor 21 of the motor generator 2 rotates in the opposite direction to the crankshaft 11. In the rolling vibration reduction device according to the embodiment, the rotor 21 of the motor generator 2 serves as a heron balancer that rotates in the opposite direction to the crankshaft 11 in order to reduce rolling vibration of the engine 1 associated with rotation of the crankshaft 11.

In the present embodiment, the engine 1, the motor generator 2, and the driving force transmission mechanism 3 form a power plant (power generator), and a rotational drive force can be transmitted from the engine 1 to the motor generator 2 by the driving force transmission mechanism 3 to generate electricity. The electricity thus generated by the motor generator 2 charges, for example, a battery that is an energy storage device via an inverter etc.

Figure 2:
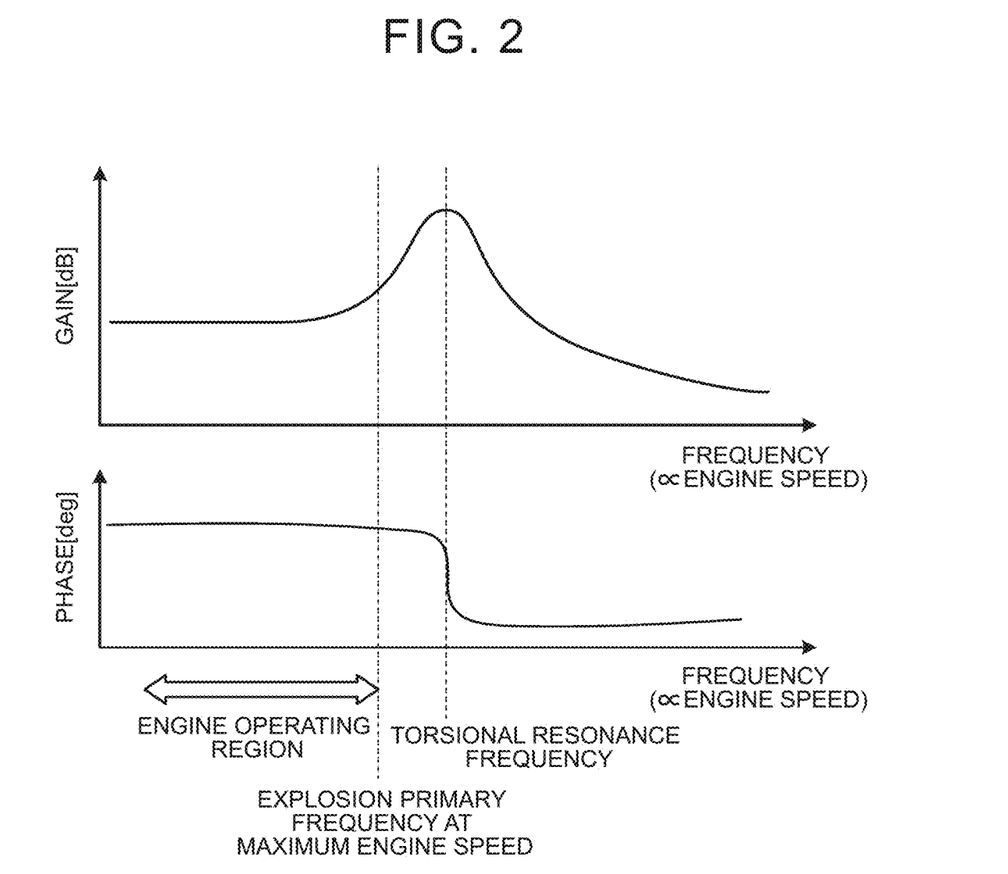
FIG. 2 shows the relationship between the explosion primary frequency and the torsional resonance frequency in the rolling vibration reduction device according to the embodiment.
Figure 3:
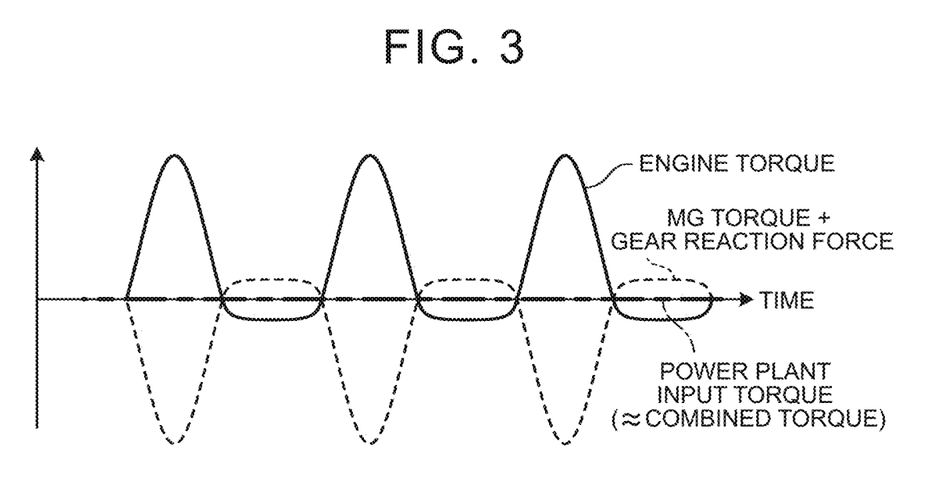
FIG. 3 shows waveforms of engine torque, the sum of motor generator (MG) torque and gear reaction force, and power plant input torque in an engine operating region when the explosion primary frequency at a maximum engine speed in the engine operating region is lower than the torsional resonance frequency.
Figure 4:
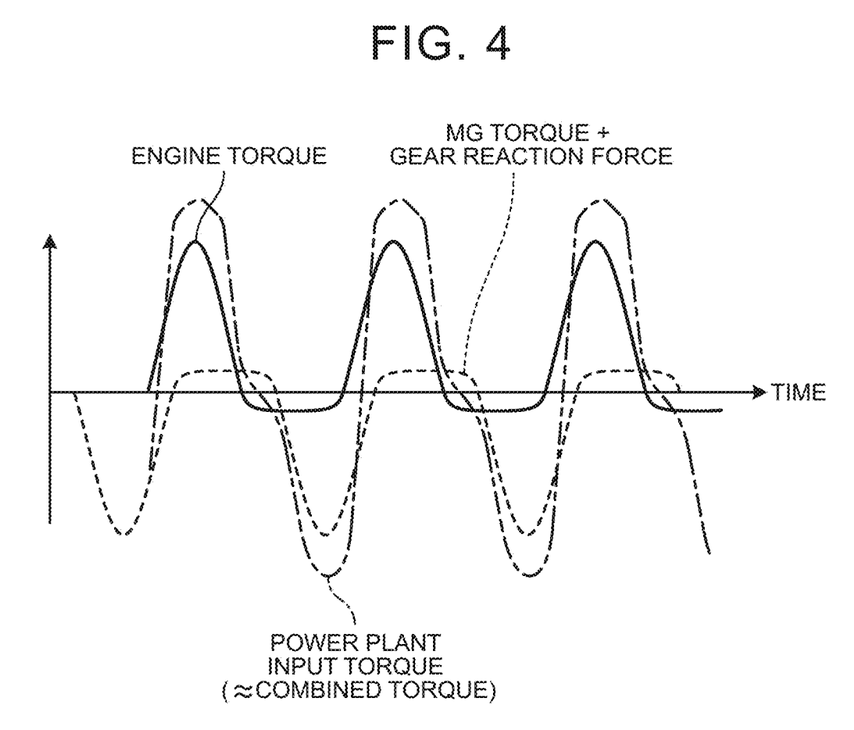
FIG. 4 shows waveforms of the engine torque, the sum of MG torque and gear reaction force, and the power plant input torque when the explosion primary frequency at the maximum engine speed in the engine operating region is equal to or higher than the torsional resonance frequency.

FIG. 2 shows the explosion primary frequency of the engine 1 and the torsional resonance frequency in the rolling vibration reduction device according to the present embodiment. FIG. 3 shows waveforms of engine torque, the sum of motor generator (MG) torque and gear reaction force, and power plant input torque in an engine operating region when the explosion primary frequency at a maximum engine speed in the engine operating region is lower than the torsional resonance frequency. FIG. 4 shows waveforms of the engine torque, the sum of MG torque and gear reaction force, and the power plant input torque when the explosion primary frequency at the maximum engine speed in the engine operating region is equal to or higher than the torsional resonance frequency.

In the present embodiment, the engine torque refers to the torque that rotates the crankshaft 11 in the engine 1, the MG torque refers to the torque that rotates the rotor 21 of the motor generator 2, and the gear reaction force refers to the reaction force of the driven gear 32 to rotation of the drive gear 31 of the driving force transmission mechanism 3.

As shown in FIG. 2, in the rolling vibration reduction device according to the present embodiment, the torsional resonance frequency in the rolling vibration reduction device (resonance frequency caused by the main inertial system, the sub-inertial system, and torsional rigidity between the main inertial system and the sub-inertial system) is set to a value higher than the explosion primary frequency at the maximum engine speed in the engine operating region. Accordingly, as shown in FIG. 3, the sum of the MG torque and the gear reaction force is the same in magnitude as, but opposite in direction to, and in phase with (the same in timing as) the engine torque in the entire engine operating region. As a result, rolling vibration can be reduced in the entire engine operating region.

On the other hand, when the engine 1 is operated so that the explosion primary frequency at the maximum engine speed in the engine operating region is equal to or higher than the torsional resonance frequency in the rolling vibration reduction device, the engine torque and the sum of the MG torque and the gear reaction force become out of phase with each other as shown in FIG. 4, and rolling vibration is amplified. The rolling vibration thus becomes worse.

In the rolling vibration reduction device according to the present embodiment, the torsional resonance frequency in the rolling vibration reduction device can be increased by changing at least one of the moment of inertia of the main inertial system or the sub-inertial system and torsional rigidity, such as by reducing the moment of inertia or increasing the torsional rigidity. The torsional resonance frequency is thus set to a value higher than the explosion primary frequency at the maximum engine speed in the engine operating region. For example, torsional rigidity elements in the rolling vibration reduction device are the crankshaft 11, the drive gear 31 and the driven gear 32 (gear tooth surface rigidity), and the rotor shaft 23.

In the rolling vibration reduction device according to the present embodiment, the torsional resonance frequency in the rolling vibration reduction device is set to a value higher than the explosion primary frequency at the maximum engine speed in the engine operating region by the following design calculations.

As used herein, $J_1$ (kg·m$^2$) represents the moment of inertia of the main inertial system, $J_2$ (kg·m$^2$) represents the moment of inertia of the sub-inertial system, i (–) represents the reduction gear ratio, and k (Nm/rad) represents the torsional rigidity. A requirement for the heron balancer is $J_2=J_1\times i$. The moment of inertia of the sub-inertial system is first converted to a moment of inertia about the axis of the main inertial system as given by the following expression (1).

$$J_2' = J_2 \times i^2 [kg \cdot m^2] \quad (1)$$

Next, the moments of inertia of the two inertial systems (main inertial system and sub-inertial system) are converted to an equivalent moment of inertia of one inertial system as given by the following expression (2).

$$J = \frac{1}{\frac{1}{J_1} + \frac{1}{J_2'}} = [kg \cdot m^2] \quad (2)$$

When there is a plurality of parts between the main inertial system and the sub-inertial system that causes torsion, torsional rigidities are combined as given by the following expression (3).

$$k = \frac{1}{\frac{1}{k_1} + \ldots + \frac{1}{k_n}} = [Nm/\text{rad}] \quad (3)$$

The torsional resonance frequency f of this system is calculated by the following expression (4).

$$k = \frac{1}{2\pi}\sqrt{\frac{k}{J}} [Hz] \quad (4)$$

The explosion primary frequency fe of a four-stroke engine is calculated by the following expression (5), where N (–) represents the number of cylinders and Ne (rpm) represents the engine speed.

$$f_e = \frac{Ne \times N}{60 \times 2} [Hz] \quad (5)$$

The moments of inertia, the torsional rigidity, and the reduction gear ratio can therefore be set so that the explosion primary frequency $fe_{max}$ at the maximum engine speed $Ne_{max}$ and the torsional resonance frequency f satisfy the relationship given by the following expression (6), where $Ne_{max}$ (rpm) represents the maximum engine speed in the engine operating region.

$$f_{e_{max}} = \frac{Ne_{max} \times N}{60 \times 2} [Hz] < f = \frac{1}{2\pi}\sqrt{\frac{k}{J}} [Hz] \quad (6)$$

Figure 5:
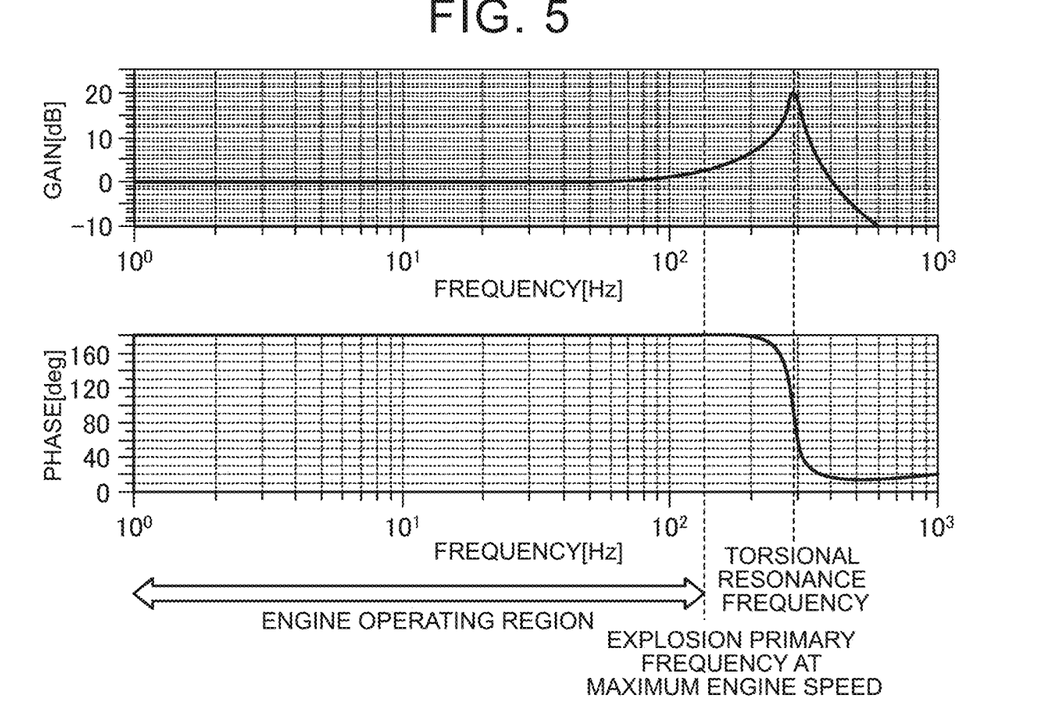
FIG. 5 shows the gain and phase of the torque transmitted to the sub-inertial system with respect to the torque of a main inertial system.

Based on the above idea, for example, such a heron balancer that the moment of inertia $J_1$ of the main inertial system is 0.03 kg·m$^2$, the moment of inertia $J_2$ of the sub-inertial system is 0.03 kg·m$^2$, the reduction gear ratio i is 1 (–), and the torsional rigidity k is 50000 Nm/rad is provided for an in-line 3-cylinder engine with $Ne_{max}$ of 5000 rpm. FIG. 5 shows the gain and phase of the torque transmitted to the sub-inertial system with respect to the torque of the main inertial system.

In FIG. 5, the torsional resonance frequency is 290 Hz and the explosion primary frequency at the maximum engine speed (5000 rpm) in the engine operating region is 125 kHz. The relationship that the torsional resonance frequency is higher than the explosion primary frequency at the maximum engine speed is therefore satisfied.

Figure 6:
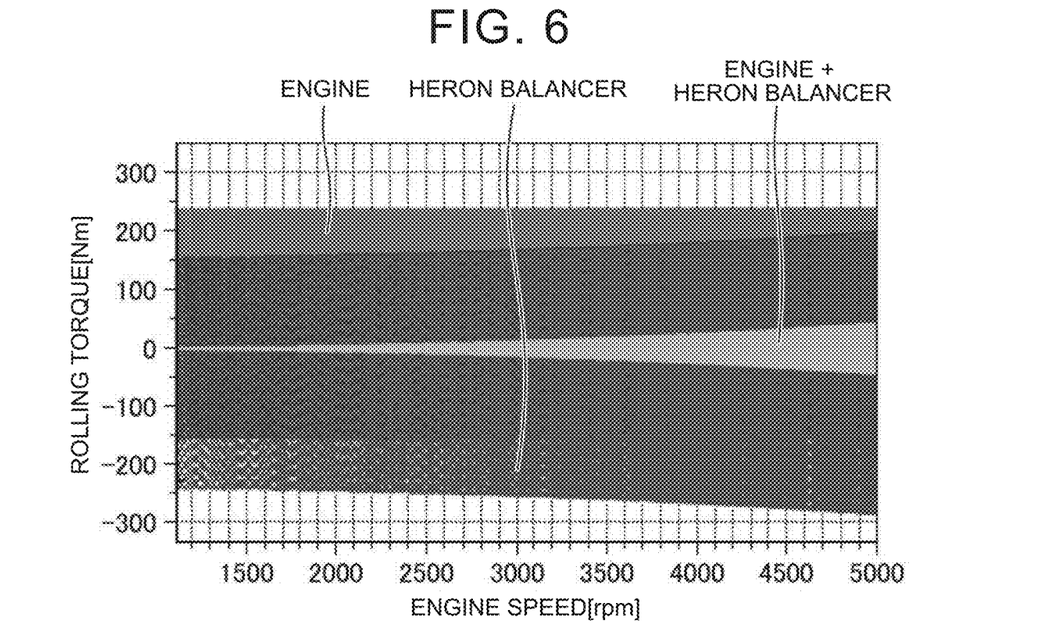
FIG. 6 shows rolling torque when an engine is operated by sweeping the engine speed from 1100 rpm to 5000 rpm.
Figure 7:
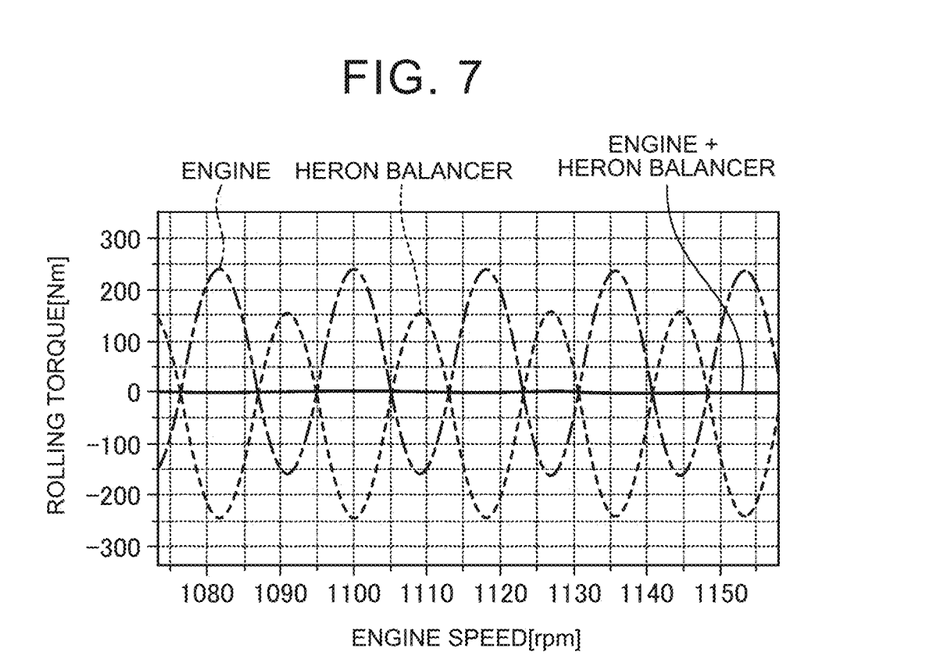
FIG. 7 shows in enlargement a region of FIG. 6 where the engine speed is around 1100 rpm.

FIG. 6 shows the result of estimating the effect that is obtained when the engine 1 is operated by sweeping the engine speed from 1100 rpm to 5000 rpm while generating torque from maximum instantaneous torque of +250 Nm to minimum instantaneous torque of –150 Nm in the rolling vibration reduction device according to the present embodiment. FIG. 6 shows the rolling torque generated by the engine 1 (torque shown by "engine" in FIG. 6), the rolling torque generated by the heron balancer (rotor 21) (torque shown by "hetero balancer" in FIG. 6), and the rolling torque that is the sum of the rolling torque generated by the engine 1 and the rolling torque generated by the heron balancer (torque shown by "engine+heron balancer" in FIG. 6). FIG. 7 shows in enlargement a region of FIG. 6 where the engine speed is around 1100 rpm, and FIG. 8 shows in enlargement a region of FIG. 6 where the engine speed is around 5000 rpm.

Figure 8:
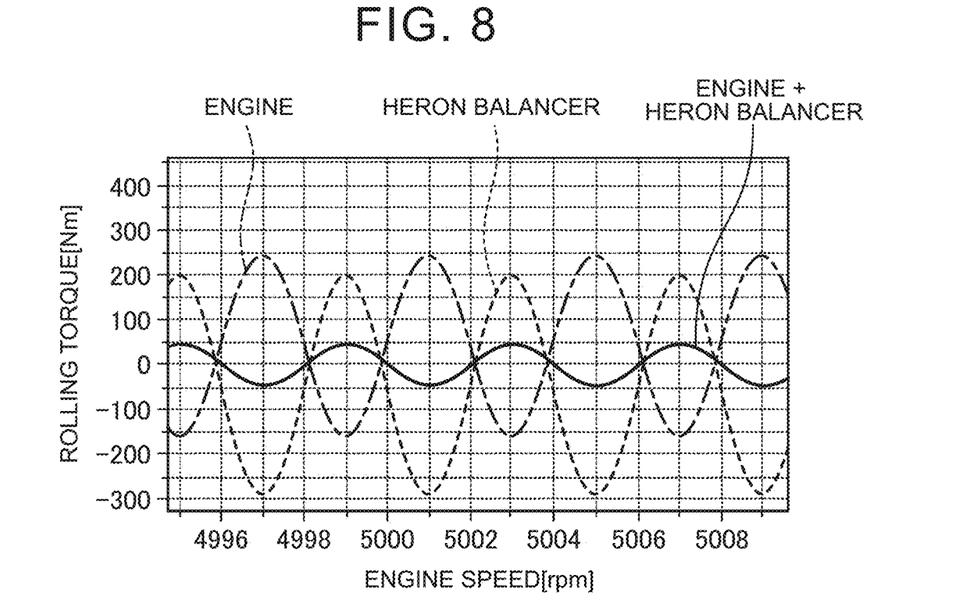
FIG. 8 shows in enlargement a region of FIG. 6 where the engine speed is around 5000 rpm.

The results shown in FIGS. 6, 7, and 8 show that the rolling torque generated by the heron balancer (support reaction force of the heron balancer) cancels the rolling torque generated by the engine 1 (roll reaction force of the engine 1), and that the rolling torque (rolling torque applied to the power plant) that is the sum of the rolling torque generated by the engine 1 and the rolling torque generated by the heron balancer can be reduced in the entire engine operating region.

Figure 9:
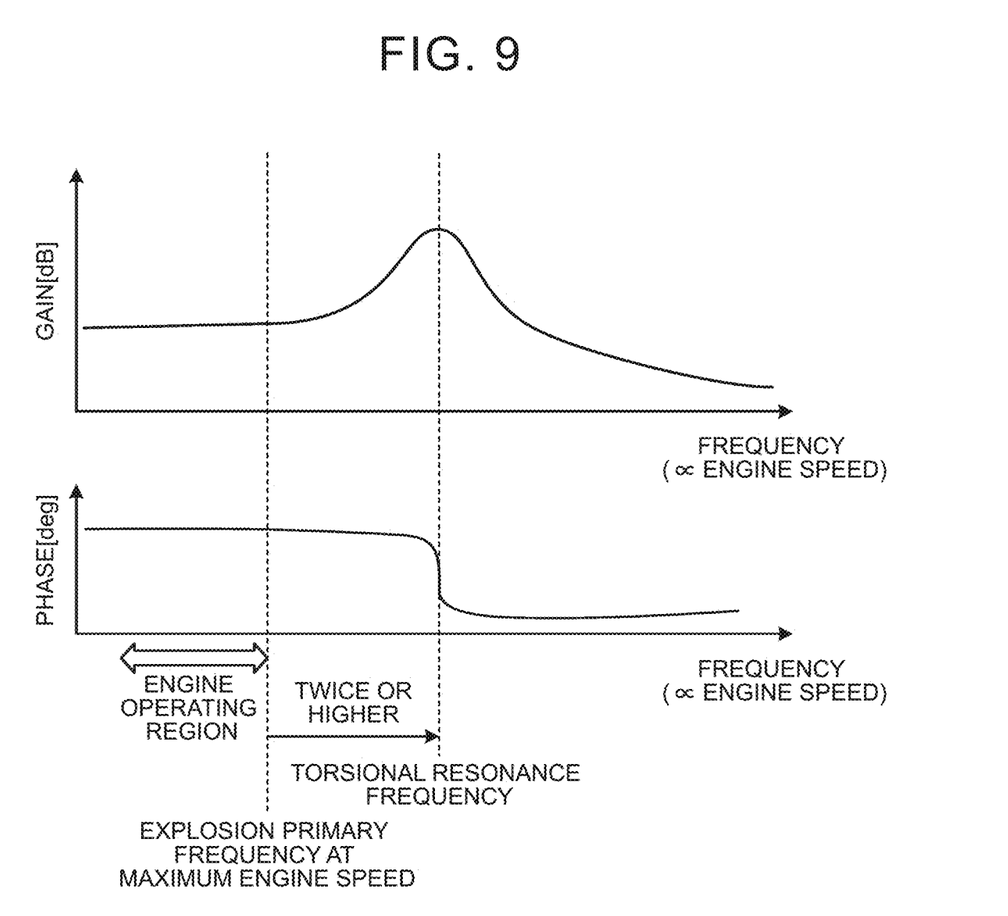
FIG. 9 shows an example in which the torsional resonance frequency is set to a value equal to or higher than twice the explosion primary frequency in the rolling vibration reduction device according to the embodiment.
Figure 10:
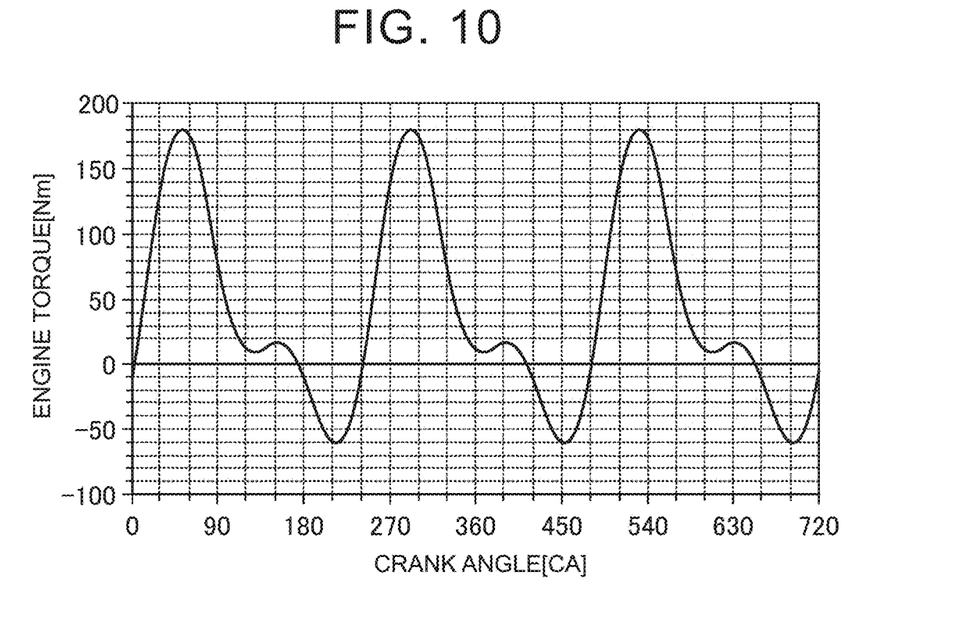
FIG. 10 shows a torque waveform including an explosion secondary component.

In the rolling vibration reduction device according to the present embodiment, as shown in FIG. 9, the torsional resonance frequency may be set to a value equal to or higher than twice the explosion primary frequency at the maximum engine speed in the engine operating region. For example, the torsional resonance frequency is set to a value equal to or higher than an explosion secondary frequency at the maximum engine speed in the engine operating region. Rolling vibration can thus be reduced in the entire engine operating region for such a torque waveform including an explosion secondary component of the engine 1 as shown in FIG. 10.

In the rolling vibration reduction device according to the present embodiment, a rotating mass may be used instead of the motor generator 2 of the sub-inertial system.

The rolling vibration reduction device according to the present embodiment includes the driving force transmission mechanism 3 that reverses rotation of the crankshaft 11 and transmits the resultant rotation to the rotor 21 by the gear train composed of the drive gear 31 and the driven gear 32 that mesh each other. However, the mechanism that reverses rotation of the crankshaft 11 and transmits the resultant rotation to the rotor 21 is not limited to the driving force transmission mechanism 3.

First Modification

Figure 11:
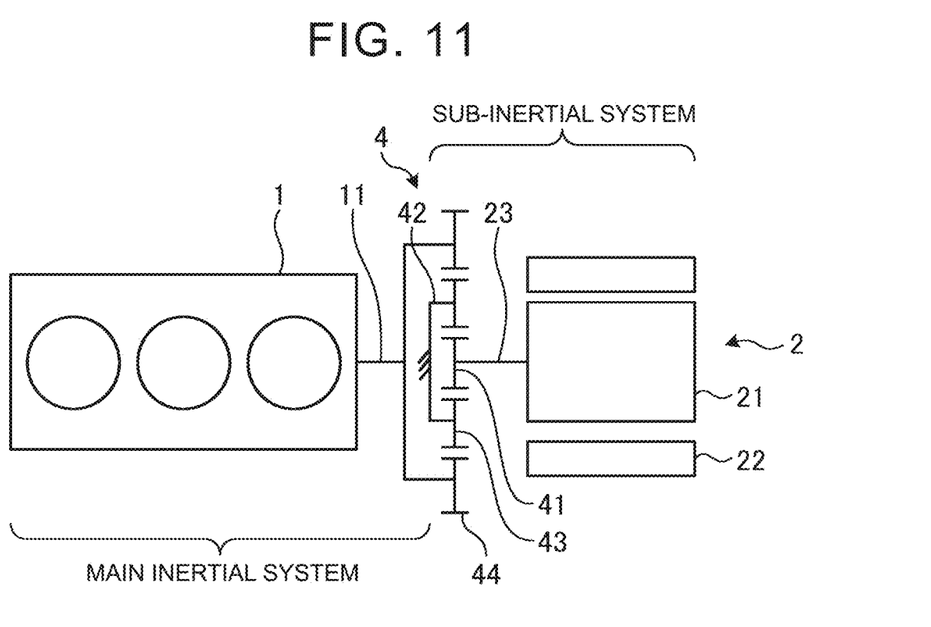
FIG. 11 shows an example of a rolling vibration reduction device according to a first modification.

FIG. 11 shows an example of a rolling vibration reduction device according to a first modification. As shown in FIG. 11, the rolling vibration reduction device according to the first modification includes a planetary gear mechanism 4 as a mechanism (driving force transmission mechanism) that reverses rotation of the crankshaft 11 and transmits the resultant rotation to the rotor 21.

The planetary gear mechanism 4 includes a ring gear 44, a sun gear 41, a plurality of planetary gears 43, and a carrier 42. The ring gear 44 has teeth on its inner periphery. The sun gear 41 is located coaxially with the ring gear 44 and has teeth on its outer periphery. The planetary gears 43 mesh with the sun gear 41 and the ring gear 44. The carrier 42 rotatably supports the planetary gears 43. The ring gear 44 is coaxially connected to the crankshaft 11 of the engine 1 and is rotatable with the crankshaft 11. The sun gear 41 is coaxially connected to the rotor shaft 23 of the motor generator 2 and is rotatable with the rotor shaft 23.

In the planetary gear mechanism 4, rotation of the crankshaft 11 is reversed by the ring gear 44, the planetary gears 43, and the sun gear 41 by restricting rotation of the carrier 42, and the resultant rotation is transmitted to the rotor shaft 23. The rotation of the crankshaft 11 is thus reversed by the planetary gear mechanism 4 and transmitted to the rotor 21 via the rotor shaft 23, and the rotor 21 rotates in the opposite direction to the crankshaft 11.

As described above, in the rolling vibration reduction device according to the first modification, the rotation of the crankshaft 11 is reversed by the planetary gear mechanism 4 and transmitted to the rotor 21. The rotor 21 can thus serve as a heron balancer for reducing rolling vibration of the engine 1 associated with the rotation of the crankshaft 11.

For example, torsional rigidity elements in the rolling vibration reduction device according to the first modification are the crankshaft 11, each gear (gear tooth surface rigidity) of the planetary gear mechanism 4, and the rotor shaft 23.

Second Modification

Figure 12:
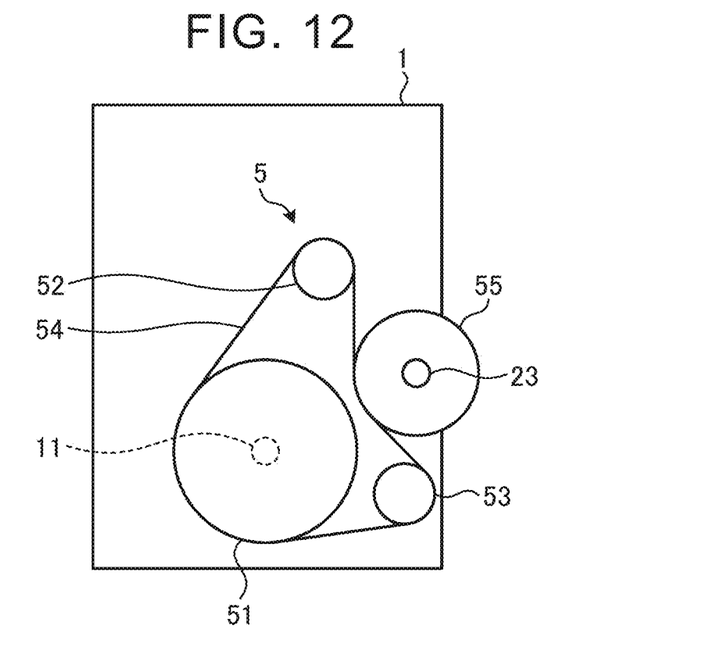
FIG. 12 shows an example of a rolling vibration reduction device according to a second modification.

FIG. 12 shows an example of a rolling vibration reduction device according to a second modification. As shown in FIG. 12, the rolling vibration reduction device according to the second modification includes a belt transmission mechanism 5 as a mechanism (driving force transmission mechanism) that reverses rotation of the crankshaft 11 and transmits the resultant rotation to the rotor 21.

The belt transmission mechanism 5 includes a crank pulley 51, idler pulleys 52, 53, a transmission belt 54, and a tensioner pulley 55. The crank pulley 51 is coaxially connected to the crankshaft 11 of the engine 1 and is rotatable with the crankshaft 11. The transmission belt 54 is rotatably wound around the crank pulley 51 and the idler pulleys 52, 53. The tensioner pulley 55 pushes the outer peripheral side (back side) of the transmission belt 54 toward the crank pulley 51 to add tension to the transmission belt 54. The tensioner pulley 55 is coaxially connected to the rotor shaft 23 of the motor generator 2 and is rotatable with the rotor shaft 23.

In the belt transmission mechanism 5, as the crank pulley 51 rotates with the crankshaft 11, the transmission belt 54 rotates in the same direction as the crankshaft 11. As the tensioner pulley 55 rotates with the rotation of the transmission belt 54, the tensioner pulley 55 rotates in the opposite direction to the crankshaft 11. In the belt transmission mechanism 5, rotation of the crankshaft 11 is thus reversed by the crank pulley 51, the transmission belt 54, and the tensioner pulley 55 and transmitted to the rotor shaft 23. As described above, in the rolling vibration reduction device according to the second modification, rotation of the crankshaft 11 is reversed by the belt transmission mechanism 5 and transmitted to the rotor 21 via the rotor shaft 23, and the rotor 21 rotates in the opposite direction to the crankshaft 11.

As described above, in the rolling vibration reduction device according to the second modification, the rotation of the crankshaft 11 is reversed by the belt transmission mechanism 5 and transmitted to the rotor 21. The rotor 21 can thus serve as a heron balancer for reducing rolling vibration of the engine 1 associated with the rotation of the crankshaft 11.

For example, torsional rigidity elements in the rolling vibration reduction device according to the second modification are the crankshaft 11, the transmission belt 54 (longitudinal elasticity), and the rotor shaft 23. The transmission belt 54 is not particularly limited as long as it is an endless member that can be wound around the crank pulley 51 etc., such as a resin belt or a metal chain belt. Auxiliary machine pulleys that transmit a rotational driving force to auxiliary machines of a vehicle may be used instead of the idler pulleys 52, 53 around which the transmission belt 54 is rotatably wound.

Third Modification

Figure 13:
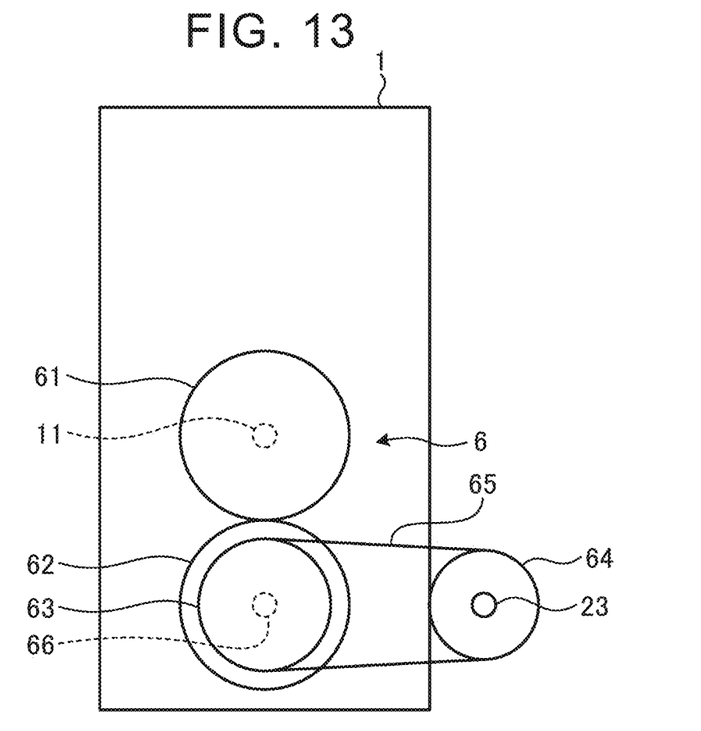
FIG. 13 shows an example of a rolling vibration reduction device according to a third modification.

FIG. 13 shows an example of a rolling vibration reduction device according to a third modification. As shown in FIG. 13, the rolling vibration reduction device according to the third modification includes a belt transmission mechanism 6 as a mechanism (driving force transmission mechanism) that reverses rotation of the crankshaft 11 and transmits the resultant rotation to the rotor 21.

The belt transmission mechanism 6 includes a drive gear 61, a driven gear 62, a drive pulley 63, a driven pulley 64, a transmission belt 65, and a balancer shaft 66. The drive gear 61 is coaxially connected to the crankshaft 11 of the engine 1 and is rotatable with the crankshaft 11. The driven gear 62 meshing with the drive gear 61 is coaxially connected to the balancer shaft 66 located parallel to the crankshaft 11, and is rotatable with the balancer shaft 66. The drive pulley 63 is coaxially connected to the balancer shaft 66 at a position closer to an end of the balancer shaft 66 than the driven gear 62 is, and is rotatable with the balancer shaft 66. The driven pulley 64 is coaxially connected to the rotor shaft 23 of the motor generator 2 and is rotatable with the rotor shaft 23. The transmission belt 65 is rotatably wound around the drive pulley 63 and the driven pulley 64. The balancer shaft 66 is provided in order to reduce pitching vibration of the engine 1.

In the belt transmission mechanism 6, as the drive gear 61 rotates with the crankshaft 11, rotation in the opposite direction to the rotation of the crankshaft 11 is transmitted to the balancer shaft 66 via the driven gear 62. When the balancer shaft 66 rotates, the rotation of the balancer shaft 66 is transmitted to the rotor shaft 23 via the drive pulley 63, the transmission belt 65, and the driven pulley 64, and the rotor 21 rotates in the same direction as the balancer shaft 66. That is, the rotor 21 rotates in the opposite direction to the crankshaft 11.

As described above, in the rolling vibration reduction device according to the third modification, the rotation of the crankshaft 11 is reversed by the belt transmission mechanism 6 and transmitted to the rotor 21. The rotor 21 can thus serve as a heron balancer for reducing rolling vibration of the engine 1 associated with the rotation of the crankshaft 11.

For example, torsional rigidity elements in the rolling vibration reduction device according to the third modification are the crankshaft 11, the transmission belt 65 (longitudinal elasticity), and the rotor shaft 23. The transmission belt 65 is not particularly limited as long as it is an endless member that can be wound around the drive pulley 63 etc., such as a resin belt or a metal chain belt.

What is claimed is:

1. A rolling vibration reduction device for an internal combustion engine, the rolling vibration reduction device comprising:
   a main inertial system configured to rotate with a crankshaft of the internal combustion engine, the main inertial system including a drive gear coaxially mounted to the crankshaft;
   a driving force transmission mechanism configured to transmit a rotational driving force of the crankshaft, a direction of the rotational driving force being reversed by the driving force transmission mechanism; and
   a sub-inertial system configured to rotate by the rotational driving force transmitted from the driving force transmission mechanism and to reduce rolling vibration of the internal combustion engine associated with rotation of the crankshaft by rotating in an opposite direction to the crankshaft, the sub-inertial system including a driven gear coaxially mounted on a rotor shaft of a motor generator,
   wherein a torsional resonance frequency in the rolling vibration reduction device is set to a value higher than an explosion primary frequency at a maximum engine speed in a preset operating region of the internal combustion engine.

2. The rolling vibration reduction device according to claim 1, wherein at least one of a moment of inertia of the main inertial system and a moment of inertia of the sub-inertial system is set in such a way that the torsional resonance frequency is set to a value higher than the explosion primary frequency.

3. The rolling vibration reduction device according to claim 1, wherein torsional rigidity of a torsional rigidity element in the rolling vibration reduction device is set in such a way that the torsional resonance frequency is set to a value higher than the explosion primary frequency.

4. The rolling vibration reduction device according to claim 1, wherein moments of inertia, a torsional rigidity, and a reduction gear ratio are set so that the explosion primary frequency at the maximum engine speed and the torsional resonance frequency satisfy the relationship given by the expression:

$$fe_{max} = \frac{Ne_{max} \times N}{60/2} [Hz] < f = \frac{1}{2n}\sqrt{\frac{k}{J}} [Hz],$$

wherein $fe_{max}$ represents the explosion primary frequency,
wherein $Ne_{max}$ represents the maximum engine speed,
wherein N represents a number of cylinders,
wherein f represents the torsional resonance frequency,
wherein k represents the torsional rigidity, and
wherein J represents the moments of inertia.

* * * * *